United States Patent
Zeng

(10) Patent No.: US 11,184,536 B2
(45) Date of Patent: Nov. 23, 2021

(54) METHOD FOR CONTROLLING A DUAL CAMERA UNIT AND DEVICE

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 34 days.

(21) Appl. No.: 16/611,430

(22) PCT Filed: May 4, 2018

(86) PCT No.: PCT/CN2018/085655
§ 371 (c)(1),
(2) Date: Nov. 6, 2019

(87) PCT Pub. No.: WO2018/219095
PCT Pub. Date: Dec. 6, 2018

(65) Prior Publication Data
US 2020/0382704 A1    Dec. 3, 2020

(30) Foreign Application Priority Data
May 31, 2017 (CN) .......................... 201710401611.0

(51) Int. Cl.
*H04N 5/232* (2006.01)
*H04N 5/225* (2006.01)
*H04N 5/235* (2006.01)

(52) U.S. Cl.
CPC ....... *H04N 5/23245* (2013.01); *H04N 5/2258* (2013.01); *H04N 5/23219* (2013.01)

(58) Field of Classification Search
None
See application file for complete search history.

(56) References Cited

U.S. PATENT DOCUMENTS 9,094,671 B2 * 7/2015 Masuda ................. G03B 35/10
9,473,708 B1   10/2016 D'Amico et al.
(Continued)

FOREIGN PATENT DOCUMENTS

CN       2718849       8/2005
CN      100407587      7/2008
(Continued)

OTHER PUBLICATIONS

India Patent Office, Examination Report for IN Application No. 201917046186, dated Jan. 25, 2021.
(Continued)

*Primary Examiner* — Mark T Monk
(74) *Attorney, Agent, or Firm* — Hodgson Russ LLP

(57) ABSTRACT

The present disclosure provides a method for controlling a dual camera unit and a device, the dual camera unit includes a first camera, a second camera and a driving component. The second camera is movable relative to the first camera. The method includes determining whether current ambient-light intensity reaches a preset threshold; controlling the driving component to deform, thereby to drive the second camera to move and change the distance between the first camera and the second camera to a first preset distance, when the current ambient-light intensity fails to reach the preset threshold; controlling the first camera and the second camera to be in a first imaging mode corresponding to the first preset distance; and controlling the first camera and the second camera to shoot in the first imaging mode, and outputting a first image in the first imaging mode.

19 Claims, 7 Drawing Sheets

(56) References Cited

U.S. PATENT DOCUMENTS

| | | | | |
|---|---|---|---|---|
| 2008/0247748 | A1* | 10/2008 | Tanimura | G03B 3/10 |
| | | | | 396/502 |
| 2009/0128647 | A1 | 5/2009 | Fahn et al. | |
| 2009/0316012 | A1 | 12/2009 | Matos | |
| 2010/0097444 | A1* | 4/2010 | Lablans | G03B 35/00 |
| | | | | 348/46 |
| 2016/0112637 | A1* | 4/2016 | Laroia | H04N 5/23245 |
| | | | | 348/221.1 |

FOREIGN PATENT DOCUMENTS

| | | |
|---|---|---|
| CN | 103780840 | 5/2014 |
| CN | 103986874 | 8/2014 |
| CN | 106170062 | 11/2016 |
| CN | 106506927 | 3/2017 |
| CN | 107087112 | 8/2017 |
| JP | 2011038909 | 2/2011 |
| WO | 2005043890 | 5/2005 |
| WO | 2016061525 | 4/2016 |

OTHER PUBLICATIONS

EPO, Office Action for EP Application No. 18808755.5, dated Dec. 10, 2020.
IWIPO, ISR for PCT/CN2018/085655, dated Jul. 18, 2018.
SIPO, Office Action for CN Application No. 201710401611.0, dated Mar. 4, 2019.
EPO, Office Action for EP Application No. 18808755.5, dated Mar. 9, 2020.

* cited by examiner

METHOD FOR CONTROLLING A DUAL CAMERA UNIT AND DEVICE

CROSS-REFERENCE TO RELATED APPLICATIONS

This application is a U.S. national phase of International Application No. PCT/CN2018/085655, filed on May 4, 2018, which claims priority to Chinese Patent Application No. 201710401611.0, filed on May 31, 2017, the entire disclosures of which are incorporated herein by reference.

TECHNICAL FIELD

The present disclosure relates to mobile terminals, and particularly to a method for controlling a dual camera unit and a device.

BACKGROUND

With the development of mobile terminal, many terminal manufacturers have begun to adopt dual camera unit configurations. For example, in Apple's dual camera unit solution, one camera has a focal length of 28 mm and the other has a focal length of 56 mm. A wide-angle image can be captured by the camera with a focal length of 28 mm. When the user is away from the subject, the user can switch to the camera with a focal length of 56 mm for taking pictures, thus it can achieve a double optical zoom. Another example is Huawei's dual camera unit solution, in which one camera collects color information and the other camera collects light intensity information. The information collected by the two cameras is combined by a certain algorithm to generate a captured image.

In order to get the effect similar to the background blur of the SLR camera, it is usually implemented by software algorithms. However, for the shooting in complex environment, high quality software algorithms are required, and blurring effect of image is not good.

SUMMARY

In view of this, embodiments of the present disclosure provide a method for controlling a dual camera unit and a device, which can output an image with better effect and more conforming to user requirements under different shooting conditions, and improve the user's shooting experience.

In a first aspect, embodiments of the present disclosure provide a method for controlling a dual camera unit. The dual camera unit includes a first camera and a second camera. The second camera is movable relative to the first camera, a driving component is connected to the second camera and is configured to drive the second camera to move. The method includes the followings.

Whether current ambient-light intensity reaches a preset threshold is determined.

The driving component is controlled to deform, thereby to drive the second camera to move and change the distance between the first camera and the second camera to a first preset distance, when the current ambient-light intensity fails to reach the preset threshold.

The first camera and the second camera are controlled to be in a first imaging mode corresponding to the first preset distance.

And the first camera and the second camera are controlled to be exposed in the first imaging mode, and output a first image in the first imaging mode.

In a second aspect, embodiments of the present disclosure provide a device for controlling a dual camera unit. The dual camera unit includes a first camera and a second camera. The second camera is movable relative to the first camera, a driving component is connected to the second camera and is configured to drive the second camera to move. The device includes the followings.

A determining module is configured to determine whether current ambient-light intensity reaches a preset threshold.

A deformation control module is configured to control the driving component to deform, thereby to drive the second camera to move and change the distance between the first camera and the second camera to a first preset distance, when the current ambient-light intensity fails to reach the preset threshold;

A mode control module is configured to control the first camera and the second camera to be in a first imaging mode corresponding to the first preset distance; and An exposure control module is configured to control the first camera and the second camera to be exposed in the first imaging mode, and outputting a first image in the first imaging mode.

In a third aspect, embodiments of the present disclosure provide a non-transitory computer readable storage medium with a computer program stored therein. The program is executed by a processor to implement the method for controlling a dual camera unit as described in the first aspect.

In a fourth aspect, embodiments of the present disclosure provide a computer program product with a computer program stored therein, wherein the instruction in the computer program product is executed by a processor, to implement the method for controlling a dual camera unit as described in the first aspect.

The method for controlling a dual camera unit and the device provided in the embodiments of the present disclosure can flexibly adjust the distance between the first camera and the second camera through the driving component, so that the first camera and the second camera can output better images under different shooting conditions and improve the user's shooting experience.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings can also be obtained from these drawings without paying any creative effort.

DETAILED DESCRIPTION

The method for controlling a dual camera unit and the device in the embodiments of the present disclosure will be described in detail below with reference to the accompanying drawings.

It should be understood that the described embodiments are only a part of the embodiments of the present disclosure, and not all of the embodiments. Based on the embodiments of the present disclosure, all other embodiments obtained by a person of ordinary skill in the art without creative efforts are the scope of the present disclosure.

Figure 1:
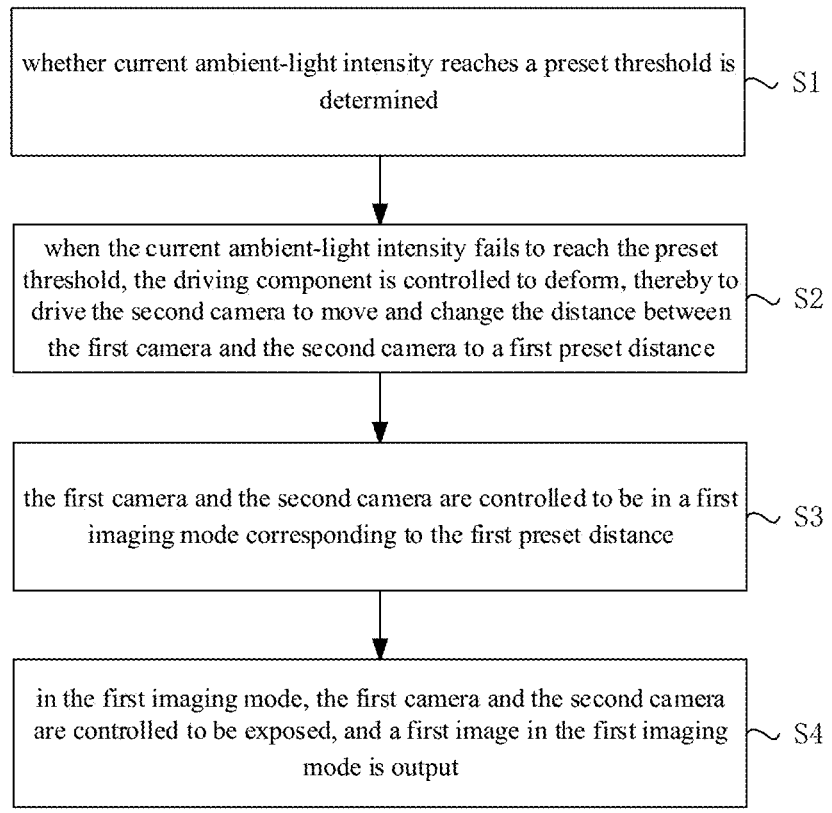
FIG. 1 is a schematic flowchart view of the method for controlling a dual camera unit according to an embodiment of the present disclosure.

FIG. 1 is a flowchart of the method for controlling a dual camera unit according to an embodiment of the present disclosure.

As shown in FIG. 1, the method for controlling a dual camera unit includes the following steps.

In step S1, whether current ambient-light intensity reaches a preset threshold is determined.

Figure 2:
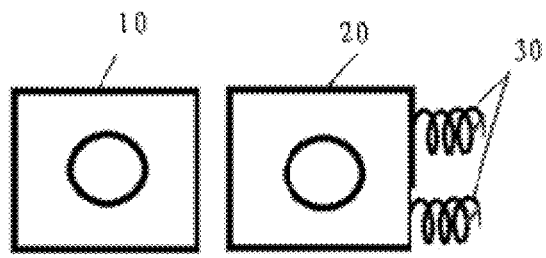
FIG. 2 is a first schematic structural view of a dual camera unit according to an embodiment of the present disclosure.

The method is applied to an electronic device with the dual camera unit, whose specific structure is shown in FIG. 2 (a top view). The dual camera unit includes a first camera 10 and a second camera 20, and the second camera 20 is movable relative to the first camera. The dual camera unit further includes a driving component 30 connected to the second camera 20 and the driving component 30 can drive the second camera 20 to move.

Figure 3:
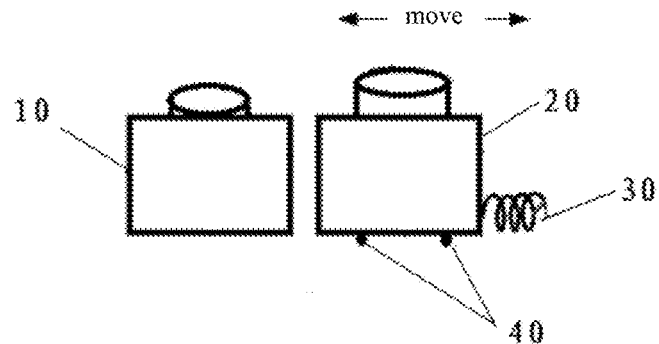
FIG. 3 is a second schematic structural view of a dual camera unit according to an embodiment of the present disclosure.

In one embodiment of the present disclosure, as shown in FIG. 3 (a side view), the first camera 10 and the second camera are placed horizontally. The first camera 10 can be fixed and remains stationary. The bottom of the second camera 20 can be equipped with balls 40, with the balls, the second camera 20 can move horizontally with the deformation (a length change) of the driving component 30 to approach or to be away from the first camera 10.

Optionally, the balls at the bottom of the second camera 20 can be replaced by other components such as a drive guide.

Optionally, the first camera 10 can be a wide-angle camera, and the second camera 20 can be a wide-angle camera or a long-focal camera.

In this embodiment, after the dual camera unit of the electronic device is activated, a luminous intensity sensor or the like can be used to determine whether the current ambient-light intensity reaches the preset threshold. For example, if the light intensity detected is less than 100 lumens when shooting in a room of ten square meters, it can be determined that the current ambient-light intensity does not reach the preset threshold.

It should be understood that the preset threshold can be adjusted correspondingly according to changes in the environment and weather conditions. Indoor, outdoor, cloudy, sunny and other different environments correspond to different preset thresholds.

In step S2, when the current ambient-light intensity fails to reach the preset threshold, the driving component is controlled to deform, thereby to drive the second camera to move and change the distance between the first camera and the second camera to a first preset distance.

In this embodiment, if the current ambient-light intensity detected by the luminous intensity sensor does not reach the preset threshold, the driving component can be controlled to deform, there by the deformation of the driving component can drive the second camera to move and change the distance between the first camera and the second camera to the first preset distance. For example, in the current scene, if the ambient-light intensity is relatively weak, the first camera and the second camera need to be close to each other, to reduce the difference between the captured images of the two cameras. The composite image obtained by images of the two cameras is used to improve the shooting effect.

Specifically, a control current can be input to the driving component, so that the driving component can be deformed according to the change of the temperature.

Optionally, in order to ensure the accuracy of controlling the driving component to deform, after the driving component is controlled to deform, a resistance value of the driving component is detected. Then a length of the deformed driving component can be determined by the resistance value, thereby whether the change of the distance between the first camera and the second camera is accurate can be determined, that is, whether the second camera is moved into the right position.

In step S3, the first camera and the second camera are controlled to be in a first imaging mode corresponding to the first preset distance.

After driving the second camera to move to change the distance between the first camera and the second camera to the first preset distance, the first camera and the second camera can be controlled to be in the first imaging mode corresponding to the first preset distance. The first imaging mode can be an image quality enhancement mode.

In step S4, in the first imaging mode, the first camera and the second camera are controlled to be exposed, and a first image in the first imaging mode is output.

In this embodiment, the first camera and the second camera can be controlled to be simultaneously exposed, and the images obtained by exposing the two cameras are combined to finally output the first image. The first image corresponds to the image quality enhancement mode, thereby the shooting effect of the image under dark light conditions is improved.

Figure 4:
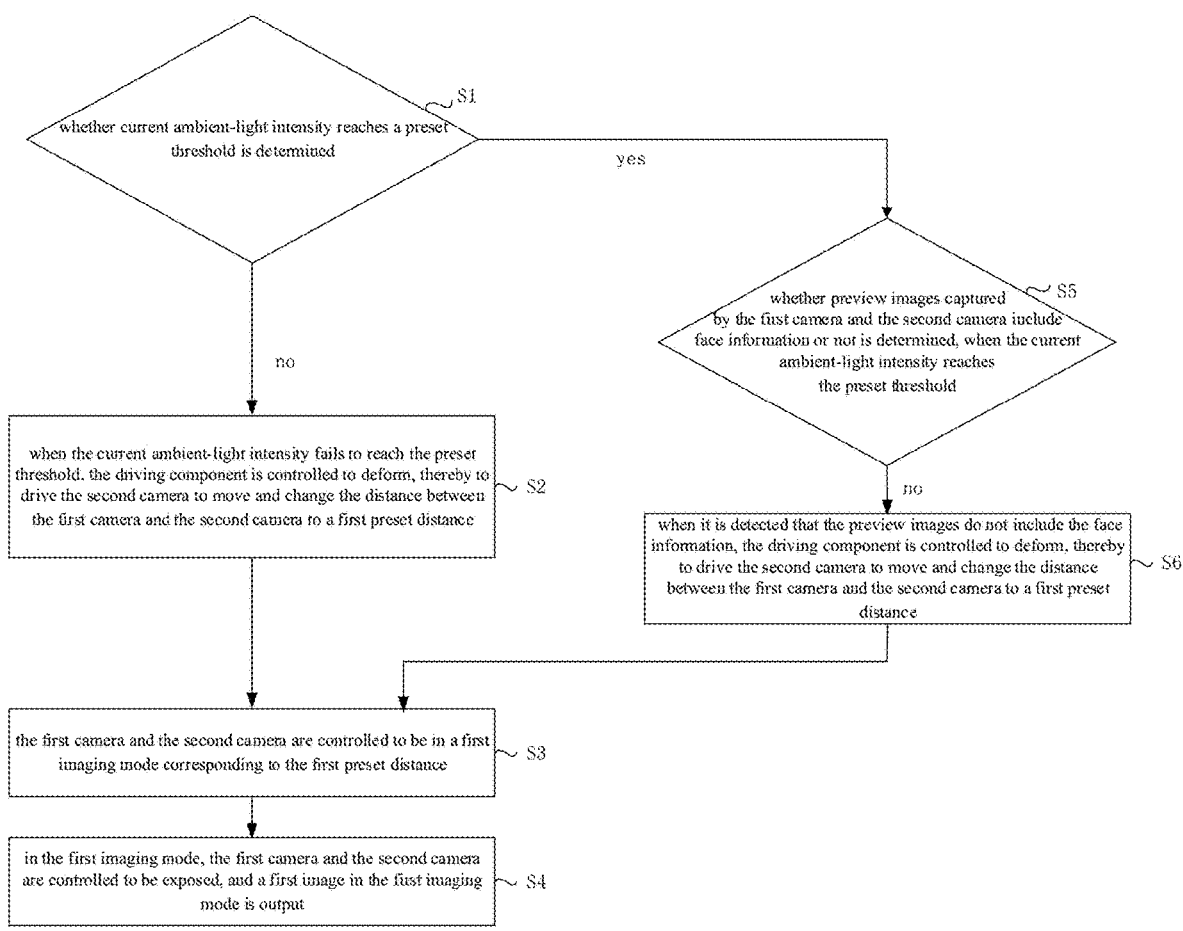
FIG. 4 is a schematic flowchart view of the method for controlling a dual camera unit according to another embodiment of the present disclosure.

In another embodiment of the present disclosure, as shown in FIG. 4, the following steps may also be included:

In step S5, whether preview images captured by the first camera and the second camera include face information or not is determined, when the current ambient-light intensity reaches the preset threshold.

In an embodiment of the present disclosure, if the current ambient-light intensity reaches a preset threshold, that is, the light intensity is sufficiently strong and the light condition is good enough, whether the preview images include the face information is further detected, to determine whether the shooting subject is a person. The preview images are captured by the first camera and the second camera.

In step S6, when it is detected that the preview images do not include the face information, the driving component is controlled to deform, thereby to drive the second camera to move and change the distance between the first camera and the second camera to a first preset distance.

If the face image information is not detected in the preview picture, it means that the current shooting subject is not a person. So that the driving component can be controlled to deform to drive the second camera to move, to change the distance between the first camera and the second camera to the first preset distance. That is to say, although the current shooting condition is good, the shooting subject is not a person and may be a landscape, a building, etc. In order to display the details of the image well, the same mode as in the dark light condition can be selected to capture an image. That is, the process jumps to step S3 for subsequent processes.

Figure 5:
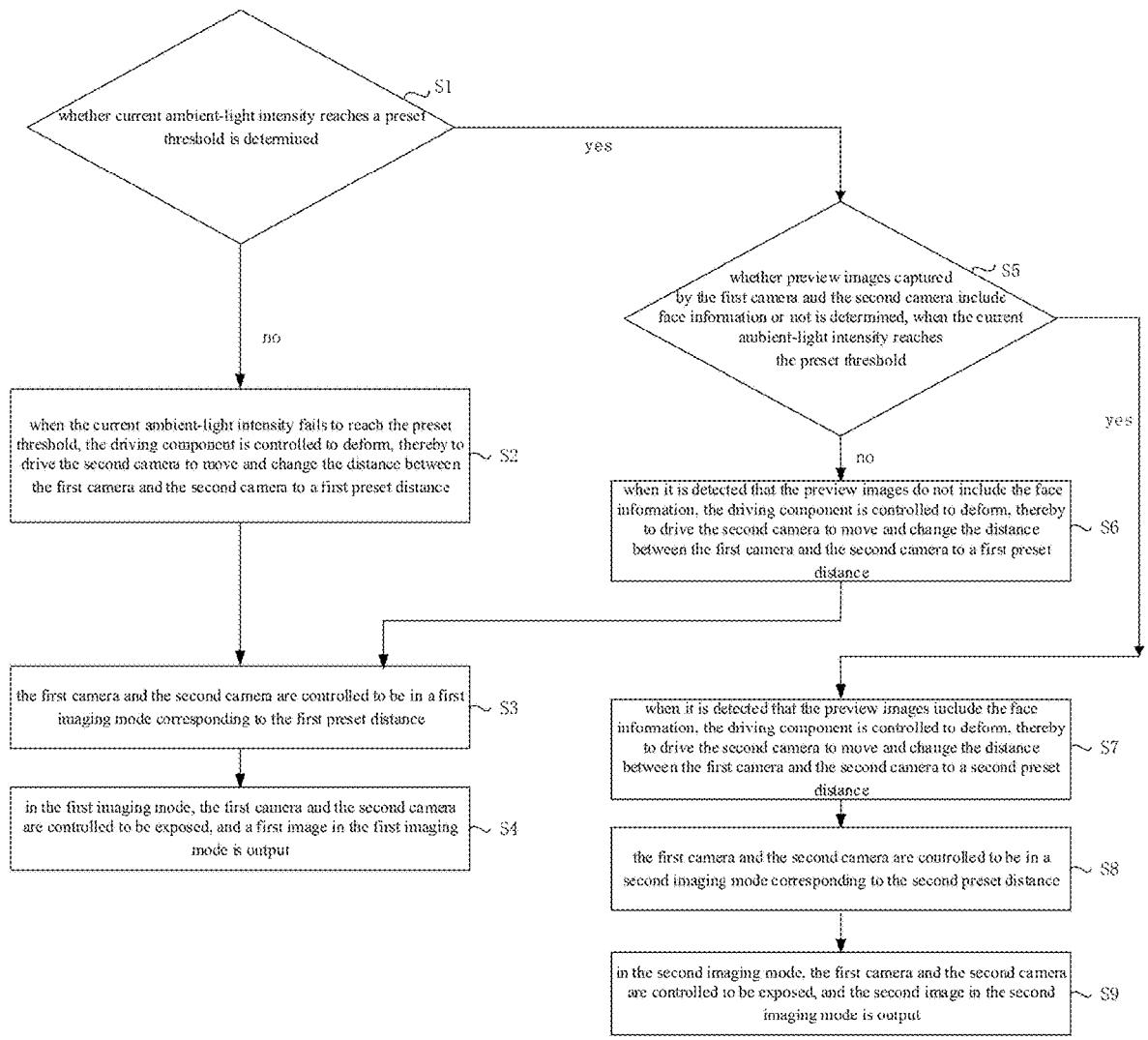
FIG. 5 is a schematic flowchart view of the method for controlling a dual camera unit according to another embodiment of the present disclosure.

In another embodiment of the present disclosure, as shown in FIG. 5, the following steps may also be included.

In step S7, when it is detected that the preview images include the face information, the driving component is controlled to deform, thereby to drive the second camera to move and change the distance between the first camera and the second camera to a second preset distance.

After step S5, if the preview images captured by the first camera and the second camera include the face information, it indicates that the shooting subject is a person. In order to highlight the subject, the shooting background needs to be blurred. Thereby, the driving component can be controlled to deform to drive the second camera to move, to change the distance between the first camera and the second camera to the second preset distance. Wherein the second preset distance is greater than the first preset distance.

Optionally, in order to improve the accuracy of determining the shooting subject as a person, the display proportion of the face in the preview images can be calculated after detecting that the preview images include the face information. If the display proportion is greater than a preset proportion, the person is determined to be the shooting subject, and the driving component is controlled to deform to drive the second camera to move, so that the distance between the first camera and the second camera can be changed to the second preset distance.

If the display proportion is less than the preset proportion, it can be determined that the person is not the shooting subject, and the driving component is controlled to deform to drive the second camera to move, so that the distance between the first camera and the second camera can be changed to the first preset distance. That is, the process jumps to step S3 for subsequent processes.

In step S8, the first camera and the second camera are controlled to be in a second imaging mode corresponding to the second preset distance.

After driving the second camera to move and change the distance between the first camera and the second camera to the second preset distance, the first camera and the second camera can be controlled to be in the second imaging mode corresponding to the second preset distance. Wherein, the second imaging mode is a portrait mode.

In step S9, in the second imaging mode, the first camera and the second camera are controlled to be exposed, and the second image in the second imaging mode is output.

Figure 6:
FIG. 6 is a schematic view of an effect in a portrait mode according to another embodiment of the present disclosure.

In the embodiment, the depth of field can be calculated by related calculation method for calculating depth of field in dual camera unit, so as to control the first camera and the second camera to be exposed, and finally output the second image. The second image is an image in the portrait mode. As shown in FIG. 6, by increasing distance between the cameras in the portrait mode, a shallow depth of field can be obtained, the realism of blurring can be enhanced, the subject can be highlighted, and the attraction of the portrait can be improved.

Figure 7:
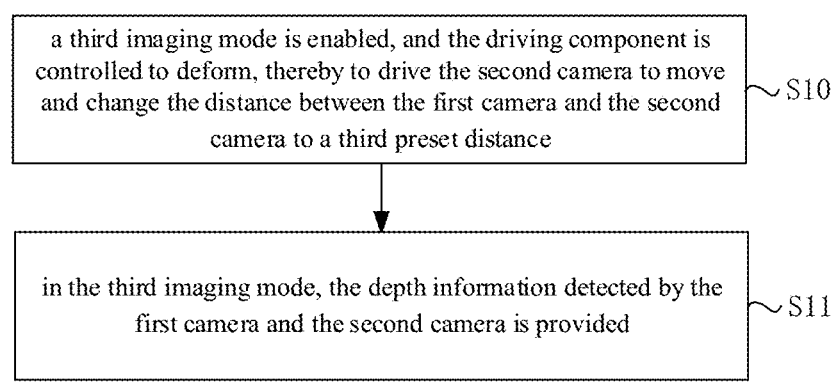
FIG. 7 is a schematic flowchart view of the method for controlling a dual camera unit according to another embodiment of the present disclosure.

In another embodiment of the present disclosure, as shown in FIG. 7, the following steps may also be included.

In step S10, a third imaging mode is enabled, and the driving component is controlled to deform, thereby to drive the second camera to move and change the distance between the first camera and the second camera to a third preset distance.

In this embodiment, after the dual camera unit of the electronic device is activated, the third imaging mode can be enabled. The second camera can be driven to move by controlling the driving component to deform, so that the distance between the first camera and the second camera can be changed to the third preset distance. Wherein the third preset distance is greater than the second preset distance. The third imaging mode can be a depth sensing mode. When the depth sensing mode is enabled, the distance between the first camera and the second camera can be increased, so that the depth information with higher precision is obtained during preview shooting.

In step S11, in the third imaging mode, the depth information detected by the first camera and the second camera is provided.

In this embodiment, the depth information detected by the first camera and the second camera can be displayed during preview shooting when the depth sensing mode is enabled, thereby providing an accurate data basis for distance measurement and 3D image rendering.

It should be understood that the driving components described in the above embodiments are SMA (Shape Memory Alloys), which have the characteristics of high control precision and easy control. The length of the deformed driver component can be determined according to the relationship between the mechanical properties and the resistance characteristics of the SMA, which will not be described in detail in this disclosure.

In the method for controlling a dual camera unit of the embodiment, the distance between the first camera and the second camera is flexibly adjusted by the driving component, so that the first camera and the second camera can output better images under different shooting conditions and improve the user's shooting experience.

In order to implement the above embodiments, the present disclosure also proposes a device for controlling a dual camera unit control.

Figure 8:
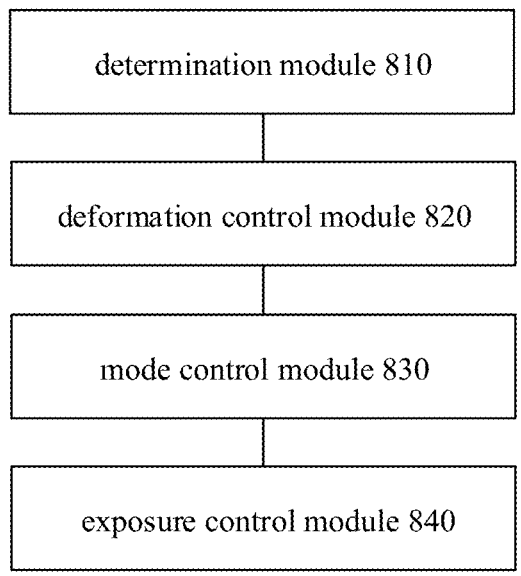
FIG. 8 is a schematic structural view of the device for controlling a dual camera unit according to an embodiment of the present disclosure.

As shown in FIG. 8, the device for controlling a dual camera unit includes a determination module 810, a deformation control module 820, a mode control module 830 and an exposure control module 840.

The determining module 810 is configured to determine whether current ambient-light intensity reaches a preset threshold. When the current ambient-light intensity fails to reach the preset threshold, the deformation control module 820 can control the driving component to deform, thereby to drive the second camera to move and change the distance between the first camera and the second camera to a first preset distance. The mode control module 830 can control the first camera and the second camera to be in a first imaging mode corresponding to the first preset distance. The exposure control module 840 can control the first camera and the second camera to be exposed in the first imaging mode, and outputting a first image in the first imaging mode.

Figure 9:
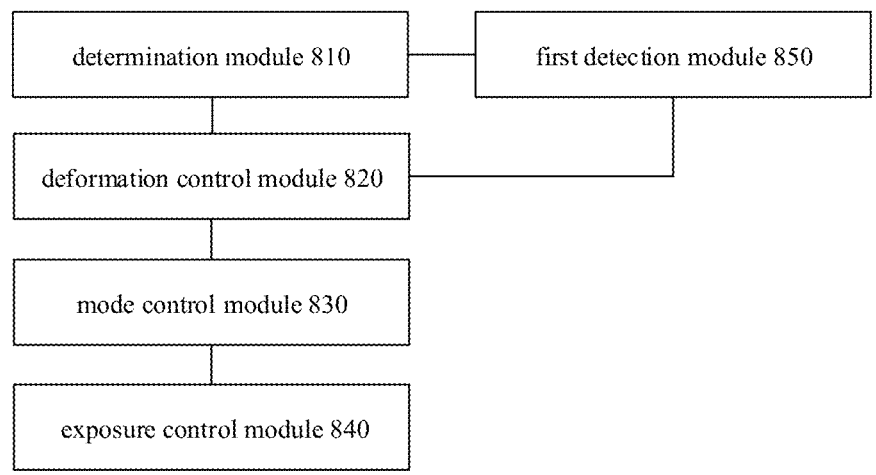
FIG. 9 is a schematic structural view of the device for controlling a dual camera unit according to another embodiment of the present disclosure.

In another embodiment of the present disclosure, as shown in FIG. 9, the device for controlling a dual camera unit further includes a first detection module 850.

When the current ambient-light intensity reaches the preset threshold, the first detecting module 850 can further detect whether preview images captured by the first camera and the second camera include face information or not. When detecting that the preview images do not include the face information, the deformation control module 820 can control the driving component to deform, thereby to drive the second camera to move and change the distance between the first camera and the second camera to a first preset distance. When detecting that the preview images include the face information, the deformation control module 820 can control the driving component to deform, thereby to drive the second camera to move and change the distance between the first camera and the second camera to a second preset distance.

After the deformation control module 820 controls the distance between the first camera and the second camera to be the second preset distance, the mode control module 830 may control the first camera and the second camera to be in a second imaging mode corresponding to the second preset distance. In the second imaging mode, the exposure control module 840 can control the first camera and the second camera to be exposed and output a second image in the second imaging mode.

Figure 10:
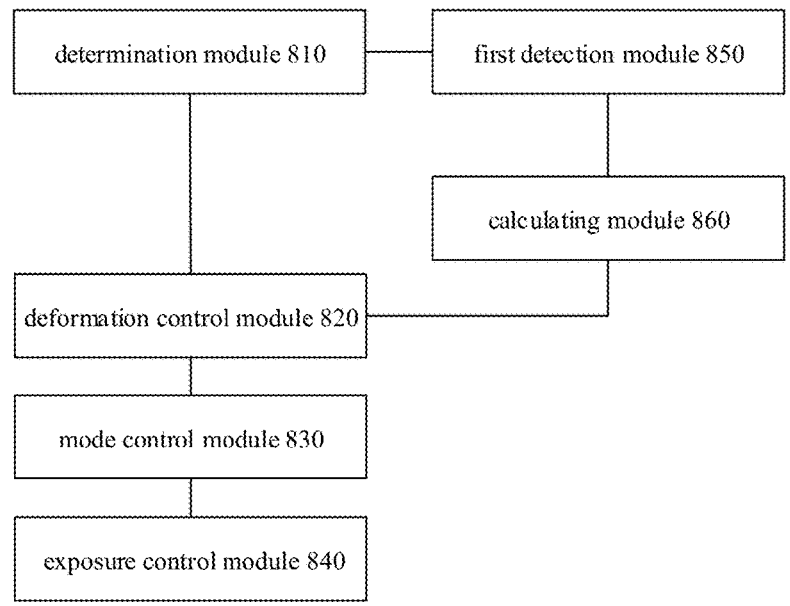
FIG. 10 is a schematic structural view of the device for controlling a dual camera unit according to another embodiment of the present disclosure.

In another embodiment of the present disclosure, as shown in FIG. 10, the device for controlling a dual camera unit further includes a calculation module 860.

After the first detection module 850 detects that the preview images include the face information, the calculating module 860 can the display proportion of the face in the preview images. When the display proportion is greater than a preset proportion, the deformation control module 820 can control the driving component to deform, thereby to drive the second camera to move and change the distance between the first camera and the second camera to a second preset distance. When the display proportion is less than the preset proportion, the deformation control module 820 can control the driving component to deform, thereby to drive the second camera to move and change the distance between the first camera and the second camera to the first preset distance.

Figure 11:
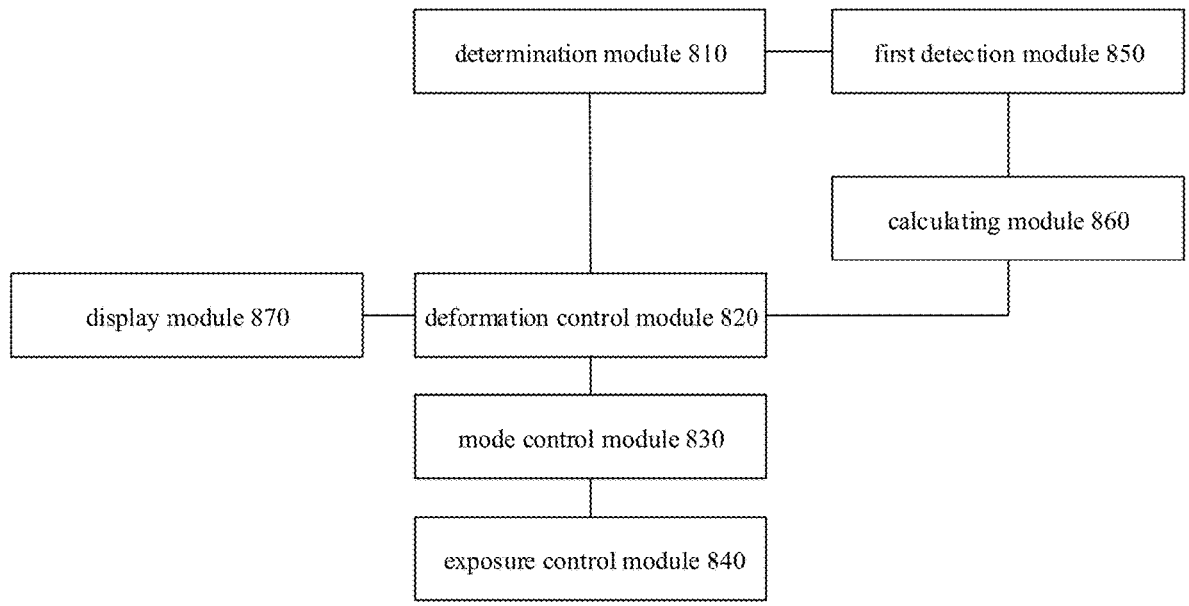
FIG. 11 is a schematic structural view of the device for controlling a dual camera unit according to another embodiment of the present disclosure.

In another embodiment of the present disclosure, as shown in FIG. 11, the device for controlling the dual camera unit further includes a display module 870.

The deformation control module 820 is further configured to enable a third imaging mode and control the driving component to deform, thereby to drive the second camera to move and change the distance between the first camera and the second camera to a third preset distance. In the third imaging mode, the display module 870 can provide the depth of field information detected by the first camera and the second camera.

Figure 12:
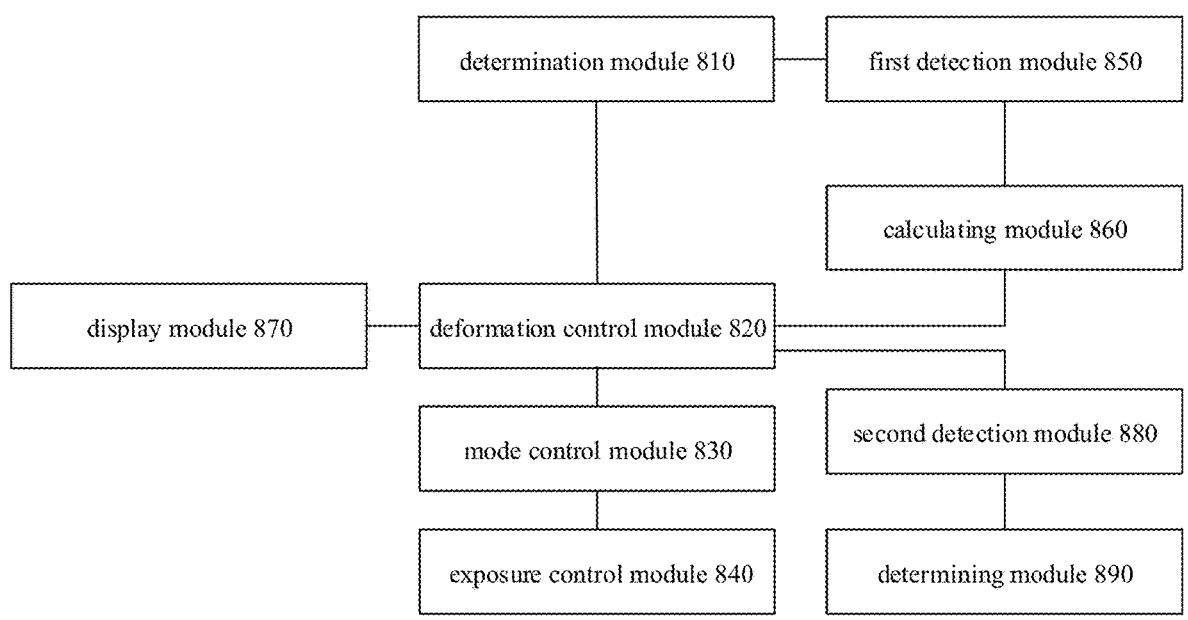
FIG. 12 is a schematic structural view of the device for controlling a dual camera unit according to another embodiment of the present disclosure.

In another embodiment of the present disclosure, as shown in FIG. 12, the device for controlling a dual camera unit further includes a second detection module 880 and a determination module 890.

After the deformation control module 820 controls the driving component to move, the second detection module 880 can detect a resistance value of the driving component. The determining module 890 can determine the change of the distance between the first camera and the second camera is accurate, according to a length of the deformed driving component determined by the resistance value.

It should be understood that with regard to the device for controlling a dual camera unit in the above embodiments, the specific manner in which each module performs the operation has been described in detail in the embodiments of the method for controlling a dual camera unit, and will not be described in detail here.

The device for controlling a dual camera unit in the embodiment can flexibly adjust the distance between the first camera and the second camera through the driving component, so that the first camera and the second camera can output better images under different shooting conditions and improve the user's shooting experience.

In order to implement the above embodiments, the present disclosure also provides a non-temporary computer readable storage medium with a computer program is stored therein. When the computer program is executed by a processor, the above method for controlling a dual camera unit can be implemented.

In order to implement the above embodiments, the present disclosure also provides a computer program product. When the instruction in the computer program product is executed by a processor, the above method for controlling a dual camera unit can be implemented.

For the embodiments of devices, the mobile devices, the computer program products and the storage medium, the descriptions are relatively simple since they are basically similar to the method embodiments, and the relevant parts can be referred to the description of the method embodiments.

It should be understood that portions of the disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, as in another embodiment, it can be implemented by any one of the following techniques known in the art or a combination thereof: a discrete logic circuit having logic gates for implementing logic functions on data signals, an application specific integrated circuit with suitable combinational logic gates, programming gate array (PGA), and field programmable gate arrays (FPGAs), etc.

In the description of the present specification, the description with reference to the terms "one embodiment", "some embodiments", "example", "specific example", or "some examples" and the like means a specific feature, structure, material or feature described in connection with the embodiment or example is included in at least one embodiment or example of the disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, those skilled in the art can combine the different embodiments or examples described in the specification and the features of the different embodiments or examples without departing from the scope of the invention.

While the embodiments of the present disclosure have been shown and described above, it is understood that the embodiments described above are illustrative and are not to be construed as limiting. Variations, modifications, alterations and variations of the above-described embodiments may be made by those skilled in the art within the scope of the present application.

It should be noted that, in this context, relational terms such as first and second are used merely to distinguish one entity or operation from another entity or operation, and do not necessarily require or imply any such actual relationship or order between such entities or operations. Furthermore, the term "include" or "comprises" or any other variations thereof is intended to encompass a non-exclusive inclusion, such that a process, method, article, or device that includes a plurality of elements includes not only those elements but also other elements not explicitly listed, or elements that are inherent to such a process, method, item, or device. An element that is defined by the phrase "including a . . . " does not exclude the presence of additional equivalent elements in the process, method, item, or device that includes the element.

It should be noted that, for the foregoing method embodiments, for the sake of simple description, they are all expressed as a series of action combinations, but those skilled in the art should understand that the present application is not limited by the described action sequence. Because certain steps may be performed in other sequences or concurrently in accordance with the present disclosure. In the following, those skilled in the art should also understand that the embodiments described in the specification are all preferred embodiments, and the actions and modules involved are not necessarily required by the present disclosure.

In the above embodiments, the descriptions of the various embodiments are different, and the details that are not detailed in a certain embodiment can be referred to the related descriptions of other embodiments.

In the several embodiments provided herein, it should be understood that the disclosed device may be implemented in other ways. For example, the device embodiments described above are schematic, for example, the division of the unit is only a logical function division, and the actual implementation may have another division manner. For example, multiple units or components may be combined or integrated into another system, or some features may be omitted or not implemented. In addition, the mutual coupling or direct coupling or communication connection shown or discussed may be an indirect coupling or communication connection through some interface, device or unit, and may be electrical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution of the present application, in essence or the contribution to the prior art, or all or part of the technical solution may be embodied in the form of a software product. The computer software product is stored in a storage medium and includes instructions for causing a computer device (which may be a personal computer, server or network device, etc.) to perform all or part of the steps of the methods described in various embodiments of the present disclosure. The foregoing storage medium includes a U disk, a Read-Only Memory (ROM), a Random Access Memory (RAM), a removable hard disk, a magnetic disk, or an optical disk, and the like.

The above embodiments are only used to illustrate the technical solutions of the present disclosure, and are not limited thereto. Although the present disclosure has been described in detail with reference to the foregoing embodiments, those skilled in the art should understand that the technical solutions described in the foregoing embodiments may be modified, or equivalent replaces some of the technical features. The modifications and substitutions of the present disclosure do not depart from the scope of the technical solutions of the embodiments of the present disclosure.

The above description is only the preferred embodiment of the present application, and is not intended to limit the scope of the present application. Any modifications, equivalent substitutions, improvements, etc. made within the spirit and principles of the present disclosure are included in the scope of the present disclosure.

What is claimed is:

1. A method for controlling a dual camera unit, wherein the dual camera unit comprises a first camera, a second camera, and a driving component, the second camera being movable relative to the first camera, the driving component being connected to the second camera and configured to drive the second camera to move, the method comprising:
   determining current ambient-light intensity;
   upon determining the current ambient-light intensity fails to reach a preset threshold, driving, through controlling the driving component to deform, the second camera to move thereby changing a distance between the first camera and the second camera to a first preset distance;
   controlling the first camera and the second camera to be in a first imaging mode corresponding to the first preset distance;
   controlling the first camera and the second camera to be exposed in the first imaging mode, and outputting a first image in the first imaging mode;
   upon determining the current ambient-light intensity reaches the preset threshold, detecting preview images captured by the first camera and the second camera; and
   upon detecting the preview images comprise face information, driving, through controlling the driving component to deform, the second camera to move thereby changing the distance between the first camera and the second camera to a second preset distance which is greater than the first distance.

2. The method of claim 1, further comprising:
   upon detecting the preview images do not comprise the face information, performing the operation of driving, through controlling the driving component to deform, the second camera to move thereby changing the distance between the first camera and the second camera to the first preset distance.

3. The method of claim 1, after the operation of driving, through controlling the driving component to deform, the second camera to move thereby changing the distance between the first camera and the second camera to a second preset distance which is greater than the first distance, the method further comprising:
   controlling the first camera and the second camera to be in a second imaging mode corresponding to the second preset distance; and controlling the first camera and the second camera to be exposed in the second imaging mode, and outputting a second image in the second imaging mode.

4. The method of claim 1, wherein the operation of driving, through controlling the driving component to deform, the second camera to move thereby changing the distance between the first camera and the second camera to a second preset distance which is greater than the first distance comprises:
calculating a display proportion of a face in the preview images; and
upon determining the display proportion is greater than a preset proportion, driving, through controlling the driving component to deform, the second camera to move thereby changing the distance between the first camera and the second camera to the second preset distance.

5. The method of claim 4, further comprising:
upon determining the display proportion is less than the preset proportion, performing the operation of driving, through controlling the driving component to deform, the second camera to move thereby changing the distance between the first camera and the second camera to the first preset distance.

6. The method of claim 1, wherein the controlling the driving component to deform comprises:
inputting a control current to the driving component, to make the driving component deform according to a temperature change of the driving component.

7. The method of claim 6, wherein after the controlling the driving component to deform, the method further comprises:
detecting a resistance value of the driving component; and
determining a change of the distance between the first camera and the second camera is accurate, according to a length of the deformed driving component determined by the resistance value.

8. The method of claim 1, wherein a material of the driving component includes shape memory alloys.

9. The method of claim 1, wherein the first camera is a wide-angle camera, and the second camera is a long focal camera.

10. The method of claim 1, further comprising:
enabling a third imaging mode;
driving, through controlling the driving component to deform, the second camera to move thereby changing the distance between the first camera and the second camera to a third preset distance; and
providing depth information detected by the first camera and the second camera in the third imaging mode.

11. The method of claim 10, wherein the third preset distance is greater than the first distance.

12. The method of claim 10, wherein the depth information is displayed on the preview images.

13. A non-transitory computer readable storage medium, with a computer program stored therein, wherein the program is executed by a processor to implement a method for controlling a dual camera unit, the dual camera unit comprises a first camera, a second camera, and a driving component, the driving component is connected to the second camera and configured to drive the second camera to approach or move away from the first camera unit, the method comprising:
determining current ambient-light intensity;
controlling a driving component to deform, thereby to drive a second camera to move and change a distance between a first camera and the second camera to a first preset distance, in response to determining that the current ambient-light intensity fails to reach a preset threshold;
detecting preview images captured by the first camera and the second camera comprise face information, in response to determining that the current ambient-light intensity reaches the preset threshold; and
controlling the driving component to deform, thereby to drive the second camera to move and change the distance between the first camera and the second camera to a second preset distance which is greater than the first distance, in response to detecting that the preview images comprise the face information.

14. A method for controlling a dual camera unit, wherein the dual camera unit comprises a first camera, a second camera and a driving component, the second camera is movable relative to the first camera, the driving component is connected to the second camera and is configured to drive the second camera to move, the method comprises:
determining whether current ambient-light intensity reaches a preset threshold;
controlling the driving component to deform, thereby to drive the second camera to move and change a distance between the first camera and the second camera to a first preset distance, when the current ambient-light intensity fails to reach the preset threshold;
detecting whether preview images captured by the first camera and the second camera comprise face information or not, when the current ambient-light intensity reaches the preset threshold; and
controlling the driving component to deform, thereby to drive the second camera to move and change the distance between the first camera and the second camera to a second preset distance which is greater than the first distance, when detecting that the preview images comprise the face information.

15. The method of claim 14, further comprising:
controlling the driving component to deform, thereby to drive the second camera to move and change the distance between the first camera and the second camera to a first preset distance, when detecting that the preview images do not comprise the face information.

16. The method of claim 14, further comprising:
calculating a display proportion of the face in the preview images; and
controlling the driving component to deform, thereby to drive the second camera to move and change the distance between the first camera and the second camera to a second preset distance, when the display proportion is greater than a preset proportion.

17. The method of claim 14, wherein after the operation of controlling the driving component to deform, thereby to drive the second camera to move and change the distance between the first camera and the second camera to a first preset distance, the method further comprises:
controlling the first camera and the second camera to be in a first imaging mode corresponding to the first preset distance; and
controlling the first camera and the second camera to shoot in the first imaging mode, and outputting a first image in the first imaging mode.

18. The method of claim 14, wherein after the operation of controlling the driving component to deform, thereby to drive the second camera to move and change the distance between the first camera and the second camera to a second preset distance, the method further comprises:

controlling the first camera and the second camera to be in a second imaging mode corresponding to the second preset distance; and controlling the first camera and the second camera to shoot in the second imaging mode, and outputting a second image in the second imaging mode.

19. The method of claim 14, further comprising:

enabling a third imaging mode, and controlling the driving component to deform, thereby to drive the second camera to move and change the distance between the first camera and the second camera to a third preset distance which is greater than the second preset distance.

* * * * *